United States Patent
Alharbi et al.

(10) Patent No.: US 12,215,395 B2
(45) Date of Patent: Feb. 4, 2025

(54) METHOD FOR RECYCLING CHROMIUM OXIDE AND FORMING CHROMIUM-ALLOY STEEL

(71) Applicant: SABIC Global Technologies B.V., Bergen op Zoom (NL)

(72) Inventors: Mansour Nasser Alharbi, Jubail (SA); Sami Muteib Almutairi, Jubail (SA); Malleswara Rao Tadiboyina, Geleen (NL)

(73) Assignee: SAUDI IRON AND STEEL COMPANY (HADEED), Jubail Industrial (SA)

( * ) Notice: Subject to any disclaimer, the term of this patent is extended or adjusted under 35 U.S.C. 154(b) by 667 days.

(21) Appl. No.: 17/432,370

(22) PCT Filed: Mar. 17, 2020

(86) PCT No.: PCT/IB2020/052429
§ 371 (c)(1),
(2) Date: Aug. 19, 2021

(87) PCT Pub. No.: WO2020/201869
PCT Pub. Date: Oct. 8, 2020

(65) Prior Publication Data
US 2022/0170124 A1    Jun. 2, 2022

Related U.S. Application Data

(60) Provisional application No. 62/827,543, filed on Apr. 1, 2019.

(51) Int. Cl.
*C21C 7/00* (2006.01)
*C21C 5/52* (2006.01)
(Continued)

(52) U.S. Cl.
CPC .......... *C21C 7/0006* (2013.01); *C21C 5/5264* (2013.01); *C21C 5/54* (2013.01);
(Continued)

(58) Field of Classification Search
CPC ....... C21C 7/0006; C21C 5/5264; C21C 5/54; C21C 7/0075; C22C 33/06; C22C 38/18; Y02P 10/20
(Continued)

(56) References Cited

U.S. PATENT DOCUMENTS

2008/0156144 A1* 7/2008 Jung .................... C22B 7/04
                                                                75/10.35

FOREIGN PATENT DOCUMENTS

CN    101194031 A    6/2008
CN    101210288 A    7/2008
(Continued)

OTHER PUBLICATIONS

Joo Hyun Park et al. Reduction Behavior of EAF Slags Containing Cr2O3 Using Aluminum at 1793K, ISIJ International, vol. 44, No. 5, pp. 790-794, 2004 (Year: 2004).*
(Continued)

*Primary Examiner* — Brian D Walck
*Assistant Examiner* — Danielle M. Carda
(74) *Attorney, Agent, or Firm* — NORTON ROSE FULBRIGHT US LLP

(57) ABSTRACT

Disclosed are processes for recycling chromium oxide and producing chromium-alloy steel. Chromium oxide is reduced to metallic chromium and metallic chromium is mixed with steel to form chromium-alloy steel.

20 Claims, 1 Drawing Sheet

(51) Int. Cl.
*C21C 5/54* (2006.01)
*C22C 33/06* (2006.01)
*C22C 38/18* (2006.01)

(52) U.S. Cl.
CPC ............ *C21C 7/0075* (2013.01); *C22C 33/06* (2013.01); *C22C 38/18* (2013.01)

(58) Field of Classification Search
USPC .......................................................... 420/34
See application file for complete search history.

(56) References Cited

FOREIGN PATENT DOCUMENTS

| | | |
|---|---|---|
| CN | 103509911 A | 1/2014 |
| CN | 103540705 A | 1/2014 |
| CN | 108660356 A | 10/2018 |
| JP | 2001181725 A * | 7/2001 |
| SU | 1101454 A1 * | 7/1984 |
| WO | WO2006131764 A1 | 12/2006 |
| WO | WO2015061249 A1 | 4/2015 |

OTHER PUBLICATIONS

Naro, Control of Slag and Insoluble Build-up in Melting Furnaces, International Iron Melting Conference, Nov. 4, 2003 (Year: 2003).*
SU1101454 A1 Translation (Year: 1984).*
JP-2001181725-A Translation (Year: 2001).*
International Search Report and Written Opinion from PCT/IB2020/052429 mailed May 12, 2020, 16 pages.
Park et al. "Reduction Behavior of EAF Slags Containing $Cr_2O_3$ Using Aluminum at 1 793 K." ISIJ International, vol. 44 (2004), No. 5, pp. 790-794.

* cited by examiner

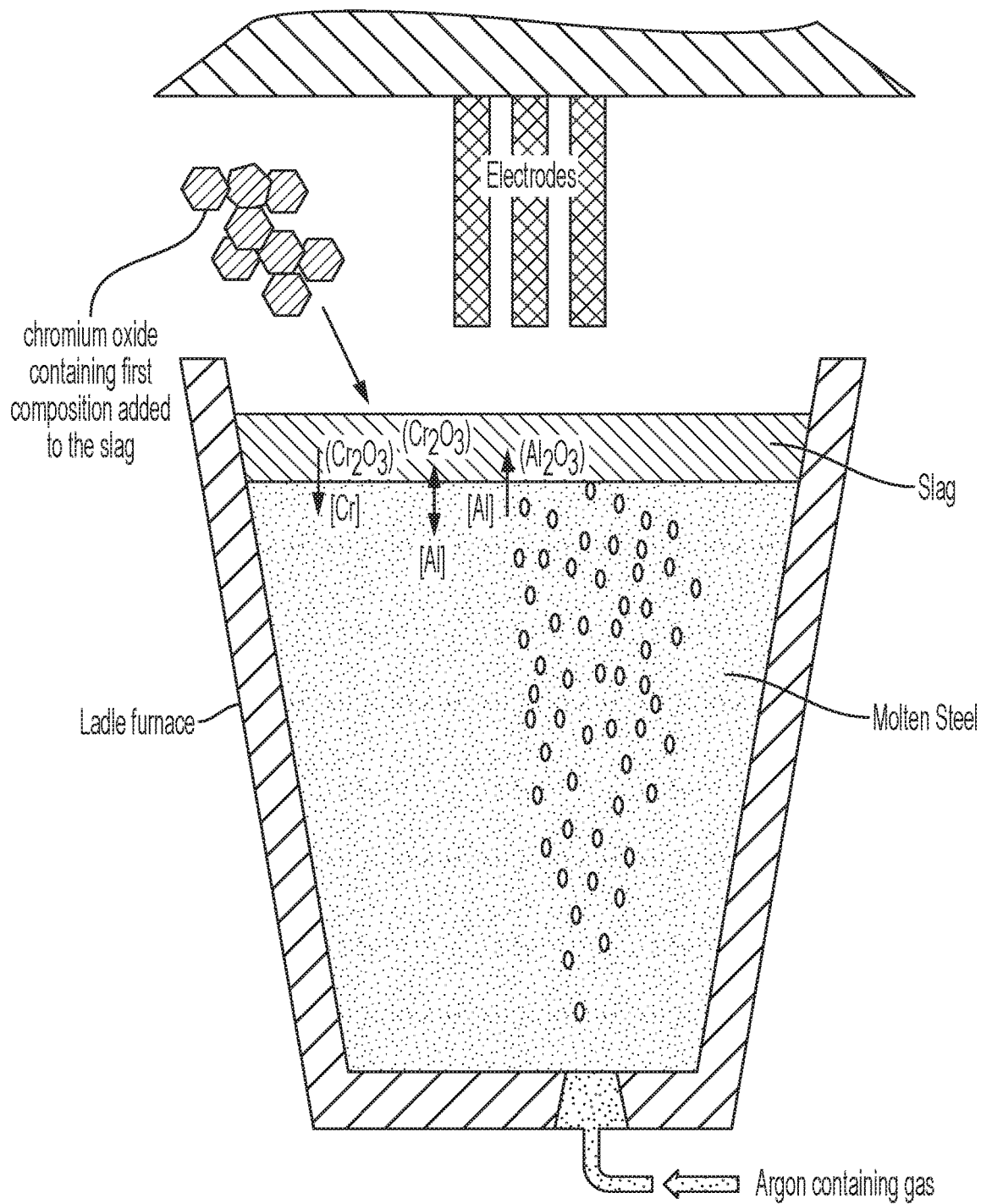

METHOD FOR RECYCLING CHROMIUM OXIDE AND FORMING CHROMIUM-ALLOY STEEL

CROSS REFERENCE TO RELATED APPLICATIONS

This application is a national phase application under 35 U.S.C. § 371 of International Application No. PCT/IB2020/052429 filed Mar. 17, 2020, which claims priority to U.S. Provisional Patent Application No. 62/827,543 filed Apr. 1, 2019. The entire contents of each of the above-referenced disclosures is specifically incorporated by reference herein without disclaimer.

FIELD OF INVENTION

The present invention generally concerns processes for metal recycling and producing metal alloys. In particular, the invention concerns processes for recycling chromium oxide and producing chromium-alloy steel.

BACKGROUND OF THE INVENTION

Chromium oxide containing waste materials such as chromium oxide containing spent catalysts are primarily disposed as landfills and can create environmental hazards. There is a need for cost effective recycling methods for chromium oxide containing waste materials.

BRIEF SUMMARY OF THE INVENTION

A discovery has been made that provides a solution to the problems of disposal of chromium oxide containing compositions. The solution is premised on recycling chromium in chromium oxide to form chromium-alloy steel.

In aspects of the present invention, a process for recycling chromium oxide and forming chromium-alloy steel is described. The process can include steps (a) and (b). In step (a) an effective amount of a first composition containing chromium oxide can be added to a second composition containing molten steel. In step (b) the chromium oxide can be reduced to form metallic chromium and the metallic chromium can get mixed with the molten steel to form chromium-alloy steel. The process can be performed in a ladle furnace during a secondary steel making process. The chromium oxide can be reduced at a temperature of 1400° C. to 1800° C., preferably 1500° C. to 1650° C., more preferably 1550° C. to 1600° C. In some aspects, the chromium oxide can be chromium (III) oxide ($Cr_2O_3$). In some aspects, the first composition can further contain alumina. In some aspects, the first composition can contain 10 to 25 wt. %, preferably 15 to 20 wt. % $Cr_2O_3$ and 70 to 85 wt. %, preferably 75 to 80 wt. % alumina. In some particular aspects, the first composition can further contain $SiO_2$ and $K_2O$ with total amount 0 to 5 wt. %. In some aspects, the first composition is a spent catalyst. In step (b) the chromium oxide can be reduced by aluminum (e.g. metallic aluminum) and the process can include adding aluminum to the second composition. The aluminum can be added to the second composition before, during or after addition of the first composition to the second composition. At least a portion of the aluminum added can reduce the chromium oxide to form alumina and the metallic chromium and at least a portion of the aluminum added can react with dissolved oxygen in the molten steel to form alumina. In some aspects, aluminum in form of an aluminum dross and/or an aluminum wire can be added to the second composition. In some aspects, the second composition can contain a slag on a top portion of the molten steel. In step (a) the first composition can be added to the slag. The slag can absorb at least a portion of the alumina formed and/or added during the process and can remove alumina from the molten steel. In some aspects, lime can be added to the slag. In some aspects, a slag conditioner can be added to the slag. An argon containing gas can be purged from a bottom portion of the molten steel. The argon containing gas can be purged at a rate suitable to lift up alumina particles in the molten steel. In some aspects, the process can further include adding one or more metals to the second composition, and the one or more metals can get mixed with the molten steel to form one or more metals-chromium-alloy steel. In some particular aspects, the one or more metals can be selected from the group consisting of molybdenum, cobalt, copper, bismuth, titanium, tungsten, vanadium, manganese and nickel.

The following includes definitions of various terms and phrases used throughout this specification.

Lime is a calcium containing inorganic mineral composed primarily of oxides, and hydroxide, usually calcium oxide and/or calcium hydroxide. Addition of lime as discussed in this disclosure can include addition of calcium oxide or calcium hydroxide or both.

The terms "about" or "approximately" are defined as being close to as understood by one of ordinary skill in the art. In one non-limiting embodiment the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The process of the present invention can "comprise," "consist essentially of," or "consist of" particular ingredients, components, compositions, etc., disclosed throughout the specification.

The term "primarily," as that term is used in the specification and/or claims, means greater than any of 50 wt. %, 50 mol. %, and 50 vol. %. For example, "primarily" may include 50.1 wt. % to 100 wt. % and all values and ranges there between, 50.1 mol. % to 100 mol. % and all values and ranges there between, or 50.1 vol. % to 100 vol. % and all values and ranges there between.

Other objects, features and advantages of the present invention will become apparent from the following FIGURES, detailed description, and examples. It should be understood, however, that the FIGURES, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

For a more complete understanding, reference is now made to the following descriptions taken in conjunction with the accompanying drawings, in which:

FIG. 1: Chromium oxide recycling and forming chromium-alloy steel in ladle furnace during secondary steel making process, according to one embodiment of the invention.

DETAILED DESCRIPTION OF THE INVENTION

A discovery has been made that provides a solution to the problems of disposal of chromium oxide containing waste material. The solution is premised on reducing chromium oxide to metallic chromium and using the metallic chromium to produce chromium alloy steel.

In aspects of the present invention, a process for recycling chromium oxide and forming chromium-alloy steel is described. A first composition containing chromium oxide can be added to a second composition containing molten steel. The chromium oxide can be reduced to form metallic chromium and the metallic chromium can be or can get mixed with the molten steel to form chromium-alloy steel. The amount of chromium oxide added can depend on targeted chromium content of chromium-alloy steel being formed.

The first composition can be a chromium oxide containing waste material. In some aspects, the first composition is a chromium oxide containing spent catalyst. In some aspect the chromium oxide can be chromium (III) oxide ($Cr_2O_3$). In some aspects, the first composition can contain alumina and $Cr_2O_3$. In some particular aspects, the first composition can contain at least any one of, equal to any one of, or between any two of 10 wt. %, 11 wt. %, 12 wt. %, 13 wt. %, 14 wt. %, 15 wt. %, 16 wt. %, 17 wt. %, 18 wt. %, 19 wt. %, 20 wt. %, 21 wt. %, 22 wt. %, 23 wt. %, 24 wt. %, and 25 wt. % $Cr_2O_3$ and at least any one of, equal to any one of, or between any two of 70 wt. %, 71 wt. %, 72 wt. %, 73 wt. %, 74 wt. %, 75 wt. %, 76 wt. %, 77 wt. %, 78 wt. %, 79 wt. %, 80 wt. %, 81 wt. %, 82 wt. %, 83 wt. %, 84 wt. %, and 85 wt. % $Al_2O_3$. The first composition can optionally contain $SiO_2$ and $K_2O$ with total $SiO_2$ and $K_2O$ content at least any one of, equal to any one of, or between any two of 0 wt. %, 1 wt. %, 2 wt. %, 3 wt. %, 4 wt. % and 5 wt. %. The chromium can be reduced at a temperature at least any one of, equal to any one of, or between any two of 1400° C., 1450° C., 1500° C., 1550° C., 1600° C., 1650° C., 1700° C., 1750° C. and 1800° C.

The chromium oxide can be reduced by aluminum, and the process can include adding aluminum to the second composition. Aluminum can be added to the second composition before, during and/or after addition of the first composition to the second composition. In some aspects, at least a portion of the aluminum added can reduce the chromium oxide to form alumina and the metallic chromium and at least a portion of the aluminum added can remove dissolved oxygen present in the molten steel by reacting with the dissolved oxygen to form alumina. In some aspects, a minimum quantity of aluminum can be added, where the minimum quantity depends on the dissolved oxygen content of the molten steel and an amount of chromium oxide added to the second composition.

In some aspects, the second composition can contain a slag on a top portion of the molten steel. In some aspects, the first composition can be added to the slag. In some aspects, the first composition can enter the molten steel from the slag, the chromium oxide can get reduced in the molten steel to form the metallic chromium and the metallic chromium can get mixed with the molten steel. The slag can absorb alumina and can remove alumina from the molten steel Alumina particles present in the molten steel can float up and get absorbed in the slag. The alumina particles in the molten steel can be at least a portion of the alumina added and/or formed during the process. The alumina added during the process can be the alumina from the first composition added. The alumina formed during the process can be the alumina formed by reduction of chromium oxide with the aluminum added and the alumina formed by the reaction of the dissolved oxygen in the molten steel with the aluminum added. In some aspects, an argon containing gas can be purged from a bottom portion of the molten steel. The argon containing gas can aid the floating up of the alumina particles in the molten steel. In some aspects, lime can be added to the slag. The lime added can aid the absorbing of alumina by the slag. The amount of lime added can depend on the alumina added and/or formed during the process. In some aspects, a slag conditioner can be added to the slag. The slag conditioner can be used as required to achieve target slag condition to facilitate final steel alloy formation and remove alumina effectively from the molten steel. In some aspects, the slag conditioner can be limestone, dolomite, calcium aluminate, fluorspar or a combination thereof.

In some aspects the slag can be a basic slag. In some aspects, the slag can contain CaO, $Al_2O_3$, $SiO_2$ and MgO.

In some aspects, one or more metals can be added to the second composition, and the one or more metals can be or can get mixed with the molten steel to form a one or more metals-chromium-alloy steel. The one or more metals can be selected from the group consisting of molybdenum, cobalt, copper, bismuth, titanium, tungsten, vanadium, manganese and nickel.

In some aspects, the process can be performed in a ladle furnace during a secondary steel making process. The first composition can be added to the second composition in a ladle furnace. The chromium oxide can get reduced and metallic chromium formed can get mixed with the molten steel in the ladle furnace. The molten steel can be refined in a ladle furnace. In the ladle furnace, the molten steel can be de-sulphurised and impurities can be removed from the molten steel. FIG. 1 shows chromium oxide recycling and forming chromium alloy steel in the ladle furnace during the secondary steel making process.

In the context of the present invention, at least the following 20 embodiments are described. Embodiment 1 is a process for recycling chromium oxide and forming chromium-alloy steel, the process includes (a) adding an effective amount of a first composition containing chromium oxide to a second composition containing molten steel; and (b) reducing the chromium oxide under conditions suitable to form metallic chromium, wherein the metallic chromium gets mixed with the molten steel to form chromium-alloy steel. Embodiment 2 is the process of embodiment 1, wherein the chromium oxide is chromium (III) oxide ($Cr_2O_3$). Embodiment 3 is the process of embodiment 2, wherein the first composition further contains alumina. Embodiment 4 is the process of embodiment 3, wherein first composition comprises 10 to 25 wt. % $Cr_2O_3$ and 70 to 85 wt. % alumina. Embodiment 5 is the process of embodiment 4, wherein the first composition further comprises 0 to 5 wt. % in total $SiO_2$ and $K_2O$. Embodiment 6 is the process of any one of embodiments 1 to 5, wherein the first composition is a spent catalyst. Embodiment 7 is the process of any one of embodiments 1 to 6, wherein in step (b) the chromium oxide is reduced by aluminum and the process includes adding aluminum to the second composition. Embodiment 8 is the process of embodiment 7, wherein the aluminum is added to the second composition before, during, and/or after addition of the first composition to the second composition. Embodiment 9 is the process of embodiments 7 or 8, wherein at least a portion of the aluminum added reduces the chromium oxide added to form the metallic chromium and alumina and at least a portion of the aluminum added reacts with dissolved oxygen in the molten steel to form alumina. Embodiment 10 is the process of any one of Embodiments 7 to 9, wherein the aluminum is added as an aluminum dross and/or an aluminum wire. Embodiment 11 is the process of any one of embodiments 1 to 10, wherein the step (b) conditions includes a temperature of 1200 to 2000° C. Embodiment 12 is the process of any one of embodiments 1 to 11, wherein the second composition contains a slag on a top portion of the molten steel. Embodiment 13 is the process of embodiment 12, wherein in step (a) the first composition is added to the slag. Embodiment 14 is the process of embodiments 12 or 13, wherein the process further includes adding lime to the slag. Embodiment 15 is the process of any one of embodiments 12 to 14, wherein the slag absorbs at least a portion of the alumina formed and added during the process. Embodiment 16 is the process of any one of embodiments 1 to 15, wherein the method further includes purging an argon containing gas from a bottom portion of the molten steel. Embodiment 17 is the process of any one of embodiments 1 to 16, wherein the process is performed during a secondary steel making process. Embodiment 18 is the process of embodiment 17, wherein the process is performed in a ladle furnace. Embodiment 19 is the process of any one of embodiments 1 to 18, the process further contains adding one or more metals to the second composition wherein the one or more metals gets mixed with the molten steel to form one or more metals-chromium-alloy steel. Embodiment 20 is the process of embodiment 19, wherein the one or more metals is selected from the group consisting of molybdenum, cobalt, copper, bismuth, titanium, tungsten, vanadium, manganese and nickel.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A process for recycling chromium oxide and forming chromium-alloy steel, the process comprising:
    adding a first composition comprising chromium oxide to a second composition comprising molten steel; and
    reducing the chromium oxide at a temperature of 1200 to 2000° C. to form metallic chromium, wherein the metallic chromium gets mixed with the molten steel to form chromium-alloy steel;
    wherein the first composition comprises 10 to 25 wt. % $Cr_2O_3$ and 70 to 85 wt. % alumina.

2. The process of claim 1, wherein the first composition comprises 80 to 85 wt. % alumina.

3. The process of claim 1, wherein the first composition further comprises from greater than 0 to 5 wt % $K_2O$.

4. The process of claim 1, wherein the first composition comprises 81 to 85 wt. % alumina.

5. The process of claim 1, wherein the first composition further comprises from greater than 0 to 5 wt. % in total of a combination of $SiO_2$ and $K_2O$.

6. The process of claim 1, wherein the first composition is a spent catalyst.

7. The process of claim 1, wherein the chromium oxide is reduced by aluminum and the process comprises adding aluminum to the second composition.

8. The process of claim 7, wherein the aluminum is added to the second composition before, during, and/or after addition of the first composition to the second composition.

9. The process of claim 7, wherein at least a portion of the aluminum added reduces the chromium oxide added, to form the metallic chromium and alumina and at least a portion of the aluminum added reacts with dissolved oxygen in the molten steel, to form alumina.

10. The process of claim 7, wherein the aluminum is added as an aluminum dross and/or an aluminum wire.

11. The process of claim 1, wherein the chromium oxide is reduced at a temperature of 1600 to 2000° C.

12. The process of claim 1, wherein the second composition comprises a slag on a top portion of the molten steel.

13. The process of claim 12, wherein the first composition is added to the slag.

14. The process of claim 12, further comprising adding lime to the slag.

15. The process of claim 12, wherein the slag absorbs at least a portion of the alumina formed and added during the process.

16. The process of claim 1, wherein the method further comprises purging an argon containing gas from a bottom portion of the molten steel.

17. The process of claim 1, wherein the process is performed during a secondary steel making process.

18. The process of claim 17, wherein the process is performed in a ladle furnace.

19. The process of claim 1, the process further comprises adding one or more metals to the second composition wherein the one or more metals gets mixed with the molten steel to form one or more metals-chromium-alloy steel.

20. The process of claim 19, wherein the one or more metals is selected from the group consisting of molybdenum, cobalt, copper, bismuth, titanium, tungsten, vanadium, manganese and nickel.

* * * * *